July 17, 1928.  
G. OLIVIER  
1,677,363  
PROCESS OF TREATING METHANE GAS  
Filed June 3, 1926
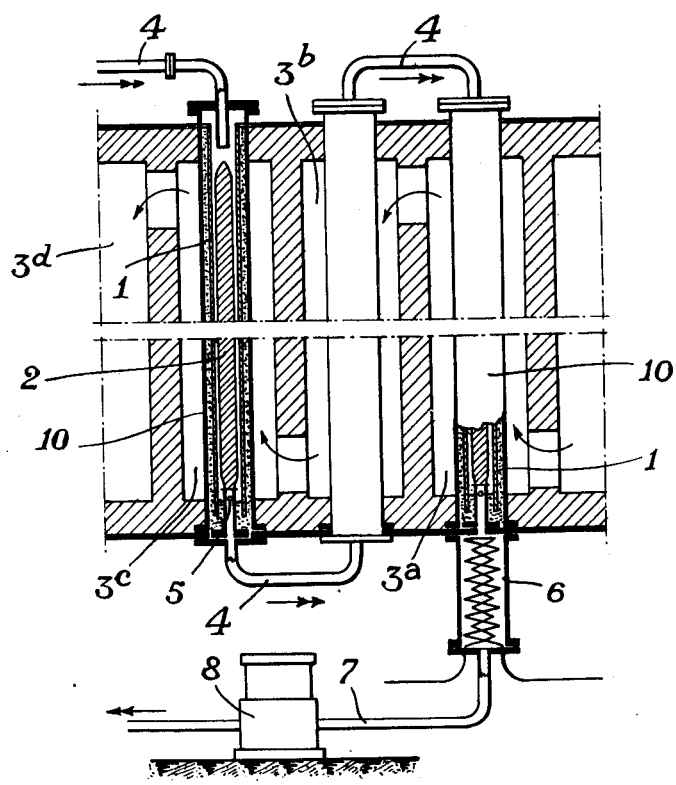
Inventor  
Georges Olivier  
By  
Attorney Patented July 17, 1928.

1,677,363

UNITED STATES PATENT OFFICE.

GEORGES OLIVIER, OF ASNIERES, FRANCE, ASSIGNOR TO SOCIETE ANONYME LE PETROLE SYNTHETIQUE, OF ASNIERES, FRANCE.

PROCESS OF TREATING METHANE GAS.

Application filed June 3, 1926, Serial No. 113,554, and in France February 3, 1926.

The object of the present invention is to provide a process for continuously converting methane gas into hydrocarbons of higher carbon content, chiefly ethylenic hydrocarbons, with the liberation of active hydrogen.

It has been known for a long time that methane ($CH_4$) passed through a porcelain tube at moderately red heat, gives rise to the formation of ethylene ($C_2H_4$) and its more condensed homologues such as propylene. The products of the reaction are then found to contain a small amount of acetylene ($C_2H_2$) and even of ethane ($C_2H_6$).

These reactions are limited by the possibility of reverse reactions corresponding to a state of equilibrium according to experimental conditions such as the gas velocity, pressures, temperatures etc. Furthermore it was not heretofore found possible to prevent the formation of naphthalene and other pyrogenated hydrocarbons capable of clogging the apparatus.

The present invention is based on a thorough study of the influences on the reactions of the time, velocity, temperature and pressure factors, which made it possible to ascertain the conditions of equilibrium and led to a process avoiding the above inconveniences and adapted to give well defined results.

This process is characterized by the simultaneous fulfilment of three essential conditions viz, the gradual and uniform heating of a thin layer or stream of methane, the continuous suction of the gases produced and the sudden and complete cooling of these gases down to atmospheric temperature. I am thus enabled to obtain a continuous conversion of the methane gas into ethylenic hydrocarbons and other gaseous hydrocarbons of higher carbon content, with a maximum output of well defined products adapted for subsequent industrial use and with liberation of active hydrogen, while the production of naphthalene and other pyrogenated hydrocarbons is avoided.

Concerning the industrial use of the products obtained, I may mention the synthetic production of alcohol from ethylene and that of liquid hydrocarbons analogous to petroleum oils.

In practice the process according to this invention is carried out by passing the methane gas in a very thin stream, preferably of annular cross-section and having a thickness which may be as little as 1 millimeter, between two refractory walls suitably heated so as gradually to bring the methane to a temperature which may reach 950° C. I am thus enabled to avoid temperature and velocity variations within the gas to be treated and the obnoxious reactions resulting therefrom, which could not be avoided in an ordinary porcelain tube.

On the other hand I maintain within the system a vacuum of about 20 centimeters of mercury in order to provide for the desired continuous suction of the gaseous products. I thus exclude the possibility of reverse reactions which would be promoted by a rise in the pressure.

Finally the sudden cooling of the gases produced efficiently checks any subsequent reaction.

With pure methane I thus obtain in a practical manner its nearly complete conversion into ethylenic hydrocarbons $C_nH_{2n}$ in preponderant proportion, with liberation of active hydrogen, the rest of the mixture consisting chiefly of saturated hydrocarbons $C_nH_{2n+2}$. The activity of the hydrogen set free results, as is well known, from its liberation at a high temperature followed by sudden cooling.

With a natural gas such as the gas of Vaux (Ain) containing about 80% of $CH_4$, 6% of $H_2$, 2,5% of $CO_2$, 2,6% of $C_3H_8$ etc., it is possible continuously to convert in a single operation about 80% of the $CH_4$ into ethylene, $C_2H_4$ and ethylenic hydrocarbons $C_nH_{2n}$.

The accompanying drawing illustrates diagrammatically by way of example, an apparatus suitable for carrying out the process according to this invention.

The apparatus shown comprises a suitable number of refractory tubes 1 connected in series by means of pipes 4. Each tube 1 is mounted within a metal tube 10 and contains a refractory cylindrical core 2 centered so as to form with the inner wall of tube 1 an annular space of a uniform thickness of a couple of millimeters.

The tubes 10 are fitted in a gas-tight manner in chambers 3ª, 3ᵇ, 3ᶜ which are connected on one side with a chamber 3 heated by a furnace, burners or otherwise, and on the other with a chamber 3ᵈ leading to the chimney, the products of combustion circulating in the direction of the single headed arrows.

The gas to be treated flows through the pipes 4 and the tubes 1 in the direction of the double-headed arrows, and passes from the annular space in each tube 1 to the next pipe 4 through perforations 5 provided under the cylindrical core 2. This gas is gradually heated in the chambers 3$^c$, 3$^b$, reaches its highest temperature in chamber 3$^a$ and as it issues therefrom it is suddenly cooled by passing through a water cooler 6 whence it is sucked, through a pipe 7, by a pump 8 which maintains the required degree of vacuum within the tubular system and compresses the gas to a pressure suitable for storing or for subsequent treatment.

It will be understood that other apparatus may be devised in order to realize the three conditions the fulfilment of which is the characteristic feature of the present invention.

I claim:

1. A process of converting methane gas into hydrocarbons of higher carbon content, consisting in gradually heating a thin stream of methane to a temperature not exceeding 950° C. which will form ethylene and ethylenic compounds, subjecting the products formed to a vacuum, and suddenly and completely cooling said products down to atmospheric temperature.

2. A process of converting methane gas into hydrocarbons of higher carbon content, consisting in gradually heating a thin stream of methane to a temperature not exceeding 950° C. at which ethylene and ethylenic compounds are formed, subjecting the products formed to a vacuum, and suddenly and completely cooling said products down to atmospheric temperature immediately after the highest temperature has been reached.

3. A process of treating methane gas consisting in gradually heating a thin stream of methane to a temperature not exceeding 950° C. which will form ethylene and ethylenic hydrocarbons, suddenly cooling said hydrocarbons down to atmospheric temperature and subjecting said hydrocarbons to a vacuum from the time they are formed until after they are completely cooled.

4. A process of converting methane gas into hydrocarbons of higher carbon content, consisting in continuously passing a stream of methane through a narrow passage, heating the walls of said passage to temperatures gradually increasing from one end thereof to the other, thereby heating said stream to a temperature not exceeding 950° C. that will form ethylene and ethylenic compounds, applying a suction to the hottest end of said passage, and suddenly cooling down to atmospheric temperature the products sucked from said hottest end.

5. A process of converting methane gas into hydrocarbons of higher carbon content, consisting in leading an annular stream of methane of very small thickness through zones of gradually increasing temperatures and thereby heating said stream to a temperature not exceeding 950° C. that will form ethylene and ethylenic compounds, subjecting the products formed to a vacuum, suddenly cooling the products coming out of the hottest zone and maintaining said vacuum until said products have been completely cooled down to atmospheric temperature.

6. A process of converting methane gas into hydrocarbons of higher carbon content, consisting in continuously passing a stream of methane between walls spaced apart from one to three millimeters, gradually heating said stream to a temperature not exceeding 950° C. that will form ethylene and ethylenic compounds subjecting the products formed to a vacuum, and suddenly and completely cooling the products to atmospheric temperature.

GEORGES OLIVIER.